(12) United States Patent
Kim et al.

(10) Patent No.: US 8,687,574 B2
(45) Date of Patent: Apr. 1, 2014

(54) SYSTEM AND METHOD OF ALLOCATING CHANNELS FOR MULTIPLE TRAFFIC STREAMS

(75) Inventors: Yong Sun Kim, Gyeryong-si (KR); Seung Eun Hong, Daejeon (KR); Kap Seok Chang, Daejeon (KR); Sung Geun Jin, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 360 days.

(21) Appl. No.: 13/029,440

(22) Filed: Feb. 17, 2011

(65) Prior Publication Data

US 2011/0199994 A1 Aug. 18, 2011

(30) Foreign Application Priority Data

Feb. 17, 2010 (KR) .................. 10-2010-0014342
Dec. 24, 2010 (KR) .................. 10-2010-0134418

(51) Int. Cl.
*H04W 4/00* (2009.01)
(52) U.S. Cl.
USPC .................. 370/329; 370/341; 370/431

(58) Field of Classification Search
None
See application file for complete search history.

(56) References Cited

U.S. PATENT DOCUMENTS

| 6,847,623 | B1 | | 1/2005 | Vayanos et al. |
| 7,580,715 | B2 | * | 8/2009 | Gorsuch et al. ............ 455/452.1 |
| 8,279,892 | B2 | * | 10/2012 | Denney et al. ................ 370/468 |
| 2004/0081134 | A1 | * | 4/2004 | Kotzin .......................... 370/348 |
| 2005/0094650 | A1 | * | 5/2005 | Choi et al. .................... 370/401 |
| 2008/0008126 | A1 | * | 1/2008 | Shirakabe et al. ............ 370/329 |

FOREIGN PATENT DOCUMENTS

KR 2009-0060951 A 6/2009

* cited by examiner

*Primary Examiner* — Kibrom T Hailu
(74) *Attorney, Agent, or Firm* — Rabin & Berdo, P.C.

(57) ABSTRACT

Provided is a system and method that may allocate channels with respect to multiple traffic channels. A channel request apparatus may determine a correlation between traffic streams to which channels are allocated, and to determine whether the traffic streams are related to each other, may generate a channel allocation request message that simultaneously requests channel allocation with respect to related traffic streams that are related to each other, and may transmit the channel allocation request message to a channel response apparatus to request the channel allocation with respect to the related traffic channels.

15 Claims, 4 Drawing Sheets

SYSTEM AND METHOD OF ALLOCATING CHANNELS FOR MULTIPLE TRAFFIC STREAMS

CROSS-REFERENCE TO RELATED APPLICATION(S)

This application claims the benefit of Korean Patent Application Nos. 10-2010-0014342 and 10-2010-0134418, respectively filed on Feb. 17, 2010 and Dec. 24, 2010, in the Korean Intellectual Property Office, the disclosures of which are incorporated herein by references.

BACKGROUND

1. Field of the Invention

The present invention relates to a system and method that may allocate channels with respect to traffic streams during communication via a wireless local area network (LAN), and more particularly, to a system and method that may simultaneously request channel allocation with respect to various types of traffic and may receive allocated channels.

2. Description of the Related Art

In the conventional wireless local area network (LAN) standard, a channel is allocated based on a Quality of Service (QoS) of traffic. The conventional wireless local area network (LAN) performs a conventional channel allocation process for each traffic stream, that is, an ADD Traffic Stream process, to allocate a channel with respect to each traffic stream. In a high-definition multimedia interface (HDMI) application or an unequal error protection (UEP) application, multiple traffic streams may exist in a single session. For example, HDMI may be constituted by an audio stream, a control stream, and a video stream. UEP may be classified as most significant bit (MSB) data and least significant bit (LSB) data. According to the conventional channel allocation method that allocates a channel for each of the streams included in the single session, several streams may receive allocated channels among related streams that are related to each other. When at least one of the related streams does not receive an allocated channel, a service may not be performed. Also, user priorities with respect to each stream are different from each other and thus, the streams are to be completely allocated. However, the conventional standard does not provide the described method. When a channel allocation is sequentially negotiated for each of the streams included in the single session, a stream that does not receive an allocated channel may exist. Even through the stream receives the allocated channel, the allocated channel may not be appropriate for a corresponding user priority.

SUMMARY

An aspect of the present invention provides a channel allocation system and method that may perform channel allocation with respect to multiple traffic streams.

Another aspect of the present invention also provides a system and method that may perform channel allocation with respect to traffic streams during communication using a wireless local area network (LAN), and the system and method may simultaneously request channel allocation with respect to various types of traffic and may receive allocated channels.

Another aspect of the present invention also provides an apparatus and method that may request channels with respect to multiple related traffic streams and may receive allocated channels, when multiple traffic streams that request different Quality of Service (QoS) conditions exist in a single session, such as a high-definition multimedia interface (HDMI) protocol and an unequal error protection (UEP) protocol.

According to an aspect of the present invention, there is provided a channel request apparatus, the apparatus including a communication unit to perform, with a channel response apparatus, transmission and reception of messages for channel allocation and channel release, a correlation determining unit to determine a correlation between traffic streams to which channels are allocated, so as to determine whether the traffic streams are related to each other, and an allocation requesting unit to generate a channel allocation request message that simultaneously requests channel allocation with respect to related traffic streams that are related to each other, and to transmit the channel allocation request message to the channel response apparatus via the communication unit.

According to an aspect of the present invention, there is provided a channel response apparatus, the apparatus including a communication unit to perform, with a channel request apparatus, transmission and reception of messages for channel allocation and channel release, and a channel allocating unit to perform determining bandwidths of channels requested by related traffic streams that are included in a channel allocation request message and that are related to each other, when the channel allocation request message is received from the channel request apparatus, determining available channels, generating, when the available channels are allocatable to all the related traffic streams, a channel allocation response message including information associated with allocated channels, and transmitting the channel allocation response message to the channel request apparatus.

According to an aspect of the present invention, there is provided a channel allocation requesting method performed by a channel request apparatus, the method including determining a correlation between traffic streams to which channels are allocated, and to determine whether the traffic streams are related to each other, generating a channel allocation request message that simultaneously requests channel allocation with respect to related traffic streams that are related to each other, and transmitting the channel allocation request message to a channel response apparatus.

According to an aspect of the present invention, there is provided a channel allocating method performed by a channel response apparatus, the method including receiving a channel allocation request message from a channel request apparatus, determining bandwidths of channels requested by related traffic streams that are included in the channel allocation request message, determining available channels, determining whether the available channels are to be allocated with respect to all the related traffic streams, generating, when the available channel are allocatable, a channel allocation response message including information associated with allocated channels, and transmitting the channel allocation response message to the channel request apparatus.

EFFECT

The present invention may provide a system and method that may request, using a single message channel allocation with respect to multiple related traffic streams, and may receive allocated channels, when multiple traffic streams that request different Quality of Service (QoS) conditions exist in a single session, such as a high-definition multimedia interface (HDMI) protocol and an unequal error protection (UEP) protocol. The present invention may simultaneously request channel allocation with respect to multiple traffic streams and thus, may promptly request channel allocation, compared with a conventional scheme. Channel allocation is requested with respect to the related traffic streams and thus, a service may be properly provided without difficulty caused by several traffic streams to which channels are not allocated among the related traffic streams. The present invention may be applicable to a fast session transfer scheme that requests fast session transfer.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Example embodiments may provide an apparatus and method that may simultaneously request channel allocation with respect to related traffic streams that are related to each other, and may receive allocated channels, when multiple traffic streams having different Quality of Service (QoS) conditions exist in a single session, such as a high-definition multimedia interface (HDMI) protocol and an unequal error protection (UEP) protocol.

Figure 1:
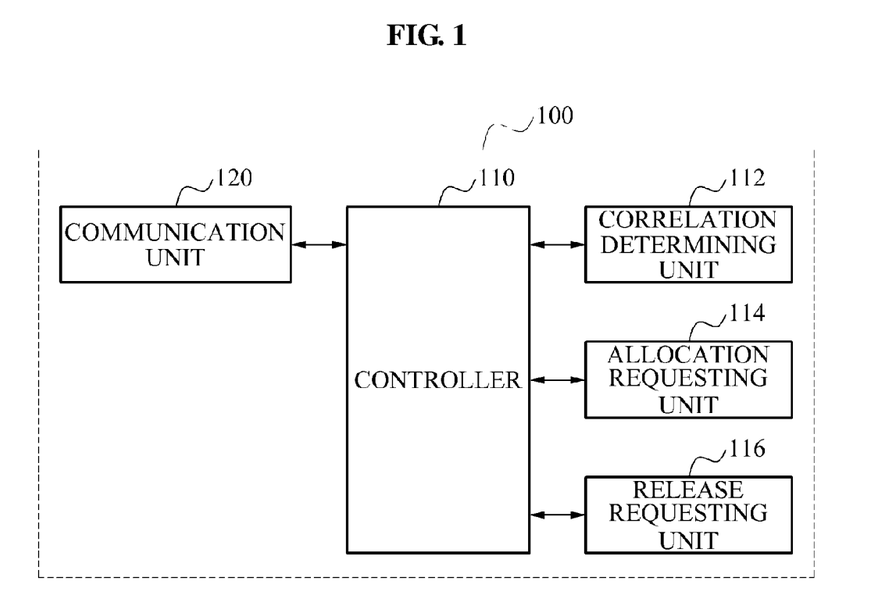
FIG. 1 is a diagram illustrating a configuration of a channel request apparatus that requests channel allocation and channel release according to an embodiment of the present invention.

FIG. 1 illustrates a configuration of a channel request apparatus 100 that requests channel allocation and channel release according to an embodiment of the present invention.

Referring to FIG. 1, the channel request apparatus 100 may include a controller 110, a communication unit 120, a correlation determining unit 112, an allocation requesting unit 114, and a release requesting unit 116.

The communication unit 120 may transmit and receive messages for channel allocation and channel release by communicating with a channel response apparatus.

When traffic streams for which channel allocation is to be performed are generated, the correlation determining unit 112 may determine a correlation of the generated traffic streams and determine related traffic streams that are related to each other.

For example, when the traffic streams are generated based on an HDMI application, an audio stream, a control stream, and a video stream that are separated from single data may be determined as the related traffic streams that are related to each other. When the traffic streams are generated based on a UEP application, most significant bit (MSB) data and least significant bit (LSB) data that are separated from single data may be determined as the related traffic stream that are related to each other.

The allocation requesting unit 114 may generate a channel allocation request message that simultaneously requests channel allocation with respect to the related traffic streams, and may transmit, via the communication unit 120, the channel allocation request message to the channel response apparatus. When the traffic streams are generated based on the HDMI application, the allocation requesting unit 114 may generate a channel allocation request message including the audio stream, the control stream, and the video stream, as opposed to generating a channel allocation request message including a single traffic stream for each time. When the traffic streams are generated based on the UEP application, the allocation requesting unit 114 may generate a channel allocation request message including a traffic stream of the MSB data and a traffic stream of the LSB data.

In this example, the channel allocation request message may be configured as illustrated in Table 1.

TABLE 1

| Order | Information |
|---|---|
| 1 | Category |
| 2 | Action |
| 3 | Dialog Token |
| 4 – n | TSPEC * number of TS requested |
| n + 1 – m | TCLAS(optional) |
| m + 1 | TCLAS Processing |

In Table 1, Category may denote a classification where a message is included, and Action may denote an identification (ID) that identifies the message in the corresponding Category. Accordingly, Category and Action may be information identifying the message. Dialog Token may denote information to be used for matching a request message and a response message. TSPEC may denote information associated with QoS conditions requested by the related traffic streams. TCLAS may denote information to be used for discerning the related traffic streams in an upper layer, may indicate whether each of the related traffic streams is Ethernet traffic or Transport Control Protocol (TCP) traffic, and may indicate a user priority for each traffic stream. TCLAS processing may denote information to be used for informing about a scheme of processing a media access control (MAC) service data unit (MSDU) received from the upper layer, when multiple TCLASs are included in the channel allocation request message.

When a channel allocation response message is received from the channel response apparatus, the allocation requesting unit 114 may determine whether the channel allocation is performed based on the channel allocation response message.

When the channel allocation is performed, the allocation requesting unit 114 may provide, to the controller 110, information associated with allocated channels.

When the channel allocation is not performed, the allocation requesting unit 114 may retransmit the channel allocation request message to the channel response apparatus, after a delay time included in the channel allocation response message.

The channel allocation response message may be configured as illustrated in Table 2.

TABLE 2

| Order | Information |
| --- | --- |
| 1 | Category |
| 2 | Action |
| 3 | Dialog Token |
| 4 | Status Code |
| 5 | TS Delay |
| 6 – n | TSPEC * number of TS requested |
| (n + 1) – m | TCLAS(optional) |
| m + 1 | TCLAS Processing |
| m + 2 | Schedule |

In Table 2, Category may denote a classification where a message is included, and Action may denote an ID that identifies a message in the corresponding Category. Accordingly, Category and Action may be information identifying the message. Dialog Token may denote information to be used for matching a request message and a response message. TSPEC may denote information associated with QoS conditions requested by the related traffic streams. TCLAS may denote information to be used for discerning the related traffic streams in a upper layer, may indicate each of the related traffic streams is a Ethernet traffic or a TCP traffic, and may indicate a user priority for each traffic stream. TCLAS processing may denote information to be used for informing about a scheme of processing a MAC service data unit (MSDU) received from the upper layer, when multiple TCLASs are included in the channel allocation response message.

Status Code may denote a value indicating whether the channel allocation is successfully performed, TS Delay may denote a delay time to be delayed for retransmitting the channel allocation request message, and Schedule may denote information indicating a time where the channel allocation is performed.

When the release requesting unit 116 detects that transmission of the related traffic streams is completed or detects that the allocated channels are released since channel allocation time is finished, the release requesting unit 116 may generate a channel release request message with respect to the related traffic streams and may transmit the generated channel release request message to the channel response apparatus.

In this example, the channel release request message may be configured as illustrated in Table 3.

TABLE 3

| Order | Information |
| --- | --- |
| 1 | Category |
| 2 | Action |
| 3 – n | TS Info * number of TS requested |
| n + 1 | Reason Code |

In Table 3, Category may denote a classification where a message is included, and Action may denote an ID that identifies the message in the corresponding Category. Accordingly, Category and Action may be information identifying the message. Reason code may denote information indicating a reason for requesting the channel release, TS Info, which is a field value included in TSPEC IE, may denote information associated with the related traffic streams.

The controller 110 may control general operations of the channel request apparatus 100. The controller 110 may perform functions of the correlation determining unit 112, the allocation requesting unit 114, and the release requesting unit 116. FIG. 1 separately illustrates the controller 110, correlation determining unit 112, the allocation requesting unit 114, and the release requesting unit 116 to explain each of the functions.

However, the controller 110 may include at least one processor configured to perform each of the functions of the correlation determining unit 112, the allocation requesting unit 114, and the release requesting unit 116. Alternatively, the controller 110 may include at least one processor to perform a portion of each of the functions of the correlation determining unit 112, the allocation requesting unit 114, and the release requesting unit 116.

Figure 2:
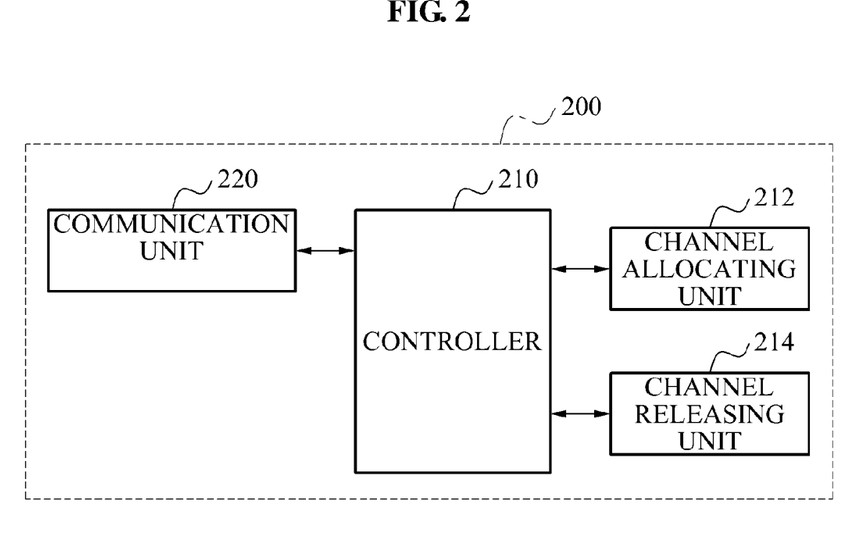
FIG. 2 is a diagram illustrating a channel response apparatus that allocates a channel and releases a channel according to an embodiment of the present invention.

FIG. 2 illustrates a channel response apparatus 200 that allocates a channel and releases a channel according to an embodiment of the present invention.

Referring to FIG. 2, the channel response apparatus 200 may include a controller 210, a communication unit 220, a channel allocating unit 212, and a channel releasing unit 214.

The communication unit 220 may transmit and receive messages for channel allocation and channel release by communicating with the channel request apparatus 100.

When a channel allocation request message is received from the channel request apparatus 100, the channel allocating unit 212 may determine bandwidths of channels requested by related traffic streams that are included in the channel allocation request message and that are related to each other, and may determine available channels.

When channel allocation is performable with respect to all the related traffic streams included in the channel allocation request message, the channel allocating unit 121 may generate a channel allocation response message including information associated with allocated channels, and may transmit the channel allocation response to the channel request apparatus 100.

When channel allocation is not performable with respect to all the related traffic streams included in the channel allocation request message, the channel allocating unit 212 may generate a channel allocation response message indicating that the channel allocation is not performed, and may transmit the channel allocation response to the channel request apparatus 100.

When a channel release request message is received from the channel request apparatus 100, the channel releasing unit 214 may determine the related traffic streams included in the channel release request message and information associated with the channels allocated to the related traffic streams, and may release the allocated channels to change the allocated channels to available channels.

The controller 210 may control general operations of the channel request apparatus 200. The controller 210 may perform functions of the channel allocating unit 212 and the channel releasing unit 214. FIG. 2 separately illustrates the controller 210, the channel allocating unit 212 and the channel releasing unit 214, to explain each of the functions. However, the controller 110 may include at least one processor configured to perform each of the functions of the channel allocating unit 212 and the channel releasing unit 214. Alternatively, the controller 110 may include at least one processor to perform a portion of each of the functions of the channel allocating unit 212 and the channel releasing unit 214.

A method that performs channel allocation with respect to multiple traffic streams in a channel allocation system configured as described above is described below.

Figure 3:
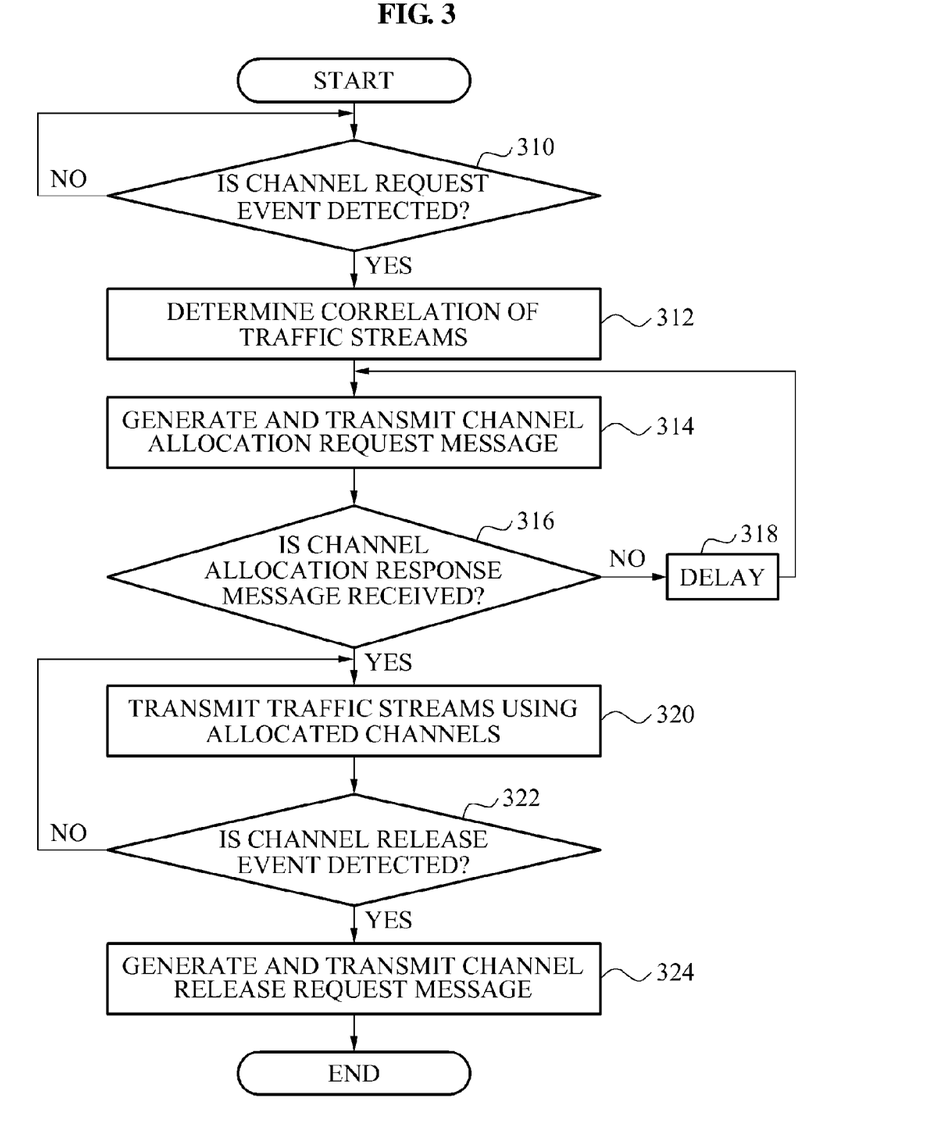
FIG. 3 is a flowchart illustrating a process that requests channels with respect to multiple related traffic streams in a channel request apparatus of a channel allocation system according to an embodiment of the present invention.

FIG. 3 illustrates a process that requests channels with respect to multiple related traffic streams in a channel request apparatus of a channel allocation system according to an embodiment of the present invention.

Referring to FIG. 3, when a channel request event is detected in operation 310, the channel request apparatus 100 may determine a correlation of traffic streams for which channel allocation is to be performed in operation 312, and may determine related traffic streams that are related to each other.

The channel request apparatus 100 may generate a channel allocation request message with respect to the related traffic streams and may transmit the generated channel allocation request message to the channel response apparatus 200 in operation 314.

In this example, the channel allocation request message may include at least one of a message ID, Dialog Token that is information to be used for matching with a channel allocation response message, TSPEC that is information associated with QoS conditions requested by the related traffic streams, TCLAS that is information to be used for discerning the related traffic streams, and TCLAS processing that is information to be used for processing the related traffic streams.

When a channel allocation response message that does not allow channel allocation is received in operation 316, the channel request apparatus 100 may return to operation 314 after a delay time included in the channel allocating response message in operation 318.

When a channel allocation response message that allows channel allocation is received in operation 316, the channel request apparatus 100 may transmit the related traffic streams, using the allocated channels in operation 320.

The channel allocation response message may include at least one of the message ID, the Dialog Token, the TSPEC, the TCLAS, the TCLAS processing, Status Code that is information indicating whether the channel allocation is successfully performed, TS delay that is information associated with time to be delayed for retransmitting the channel allocation request message, and Schedule that is information indicating a time where the channel allocation is performed.

When transmission of the related traffic streams is completed or release of the allocated channels since channel allocation time is completed is detected in operation 322, the channel request apparatus 100 may generate a channel release request message with respect to the related traffic steams and may transmit the generated channel release request message to the channel response apparatus 200.

In this example, the channel release request message may include at least one of the message ID, Reason Code that is information indicating a reason for requesting the channel release, and TS Info that is information associated with the related traffic streams.

Figure 4:
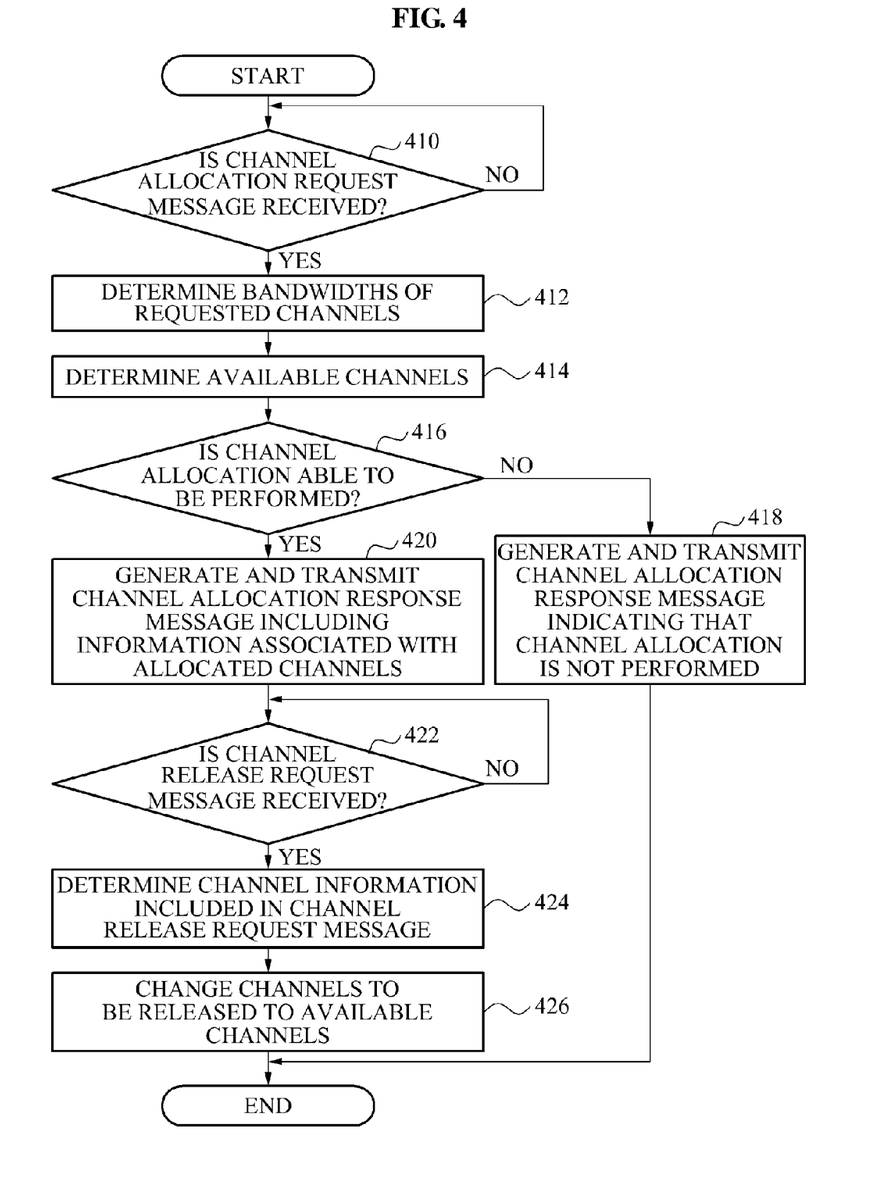
FIG. 4 is a flowchart illustrating a process that allocates channels with respect to multiple related traffic streams in a channel response apparatus of a channel allocation system according to an embodiment of the present invention.

FIG. 4 illustrates a process that allocates channels with respect to multiple related traffic streams in the channel response apparatus 200 of a channel allocation system according to an embodiment of the present invention.

Referring to FIG. 4, when a channel allocation request message is received in operation 410, the channel response apparatus 200 may determine bandwidths of channels requested by related traffic streams that are included in the channel allocation request message and that are related to each other in operation 412. The channel response apparatus 200 may determine currently available channels in operation 414.

The channel allocation request message may include at least one of a message ID, Dialog Token that is information to be used for matching with a channel allocation response message, TSPEC that is information associated with QoS conditions requested by the related traffic streams, TCLAS that is information to be used for discerning the related traffic streams, and TCLAS processing that is information to be used for processing the related traffic streams.

The channel response apparatus 200 may determine whether channel allocation is performable with respect to all the related traffic streams included in the channel allocation request message in operation 416.

When the channel allocation is not performable with respect to all the related traffic streams included in the channel allocation request message in operation 416, the channel response apparatus 200 may generate a channel allocation response message indicating the channel allocation is not performed and may transmit the generated channel allocation request message to the channel request apparatus 100 in operation 418.

When the channel allocation is performable with respect to the related traffic streams included in the channel allocation request message in operation 416, the channel response apparatus 200 may generate a channel allocating response message including information associated with allocated channel, and may transmit the generated channel allocation response message to the channel request apparatus 100 in operation 420.

When a channel release request message is received from the channel request apparatus 100 in operation 422, the channel response apparatus 200 may determine the related traffic streams included in the channel release request message and information associated with the channels allocated to the related traffic streams in operation 424. The channel response apparatus 200 may release the allocated channels in operation 426 to change the allocated channels to available channels.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A channel request apparatus, the apparatus comprising: a communication unit configured to perform, with a channel response apparatus, transmission and reception of messages for channel allocation and channel release; a correlation determining unit configured to determine a correlation among a plurality of traffic streams the plurality of traffic streams requesting different Quality of Service (QoS) conditions; an allocation requesting unit configured to generate a channel allocation request message that simultaneously requests channel allocation of a plurality of channels, each to one of the plurality of correlated traffic streams, and to transmit the channel allocation request message to the channel response apparatus via the communication unit; and wherein, when the allocation request unit determines, based on a channel allocation response message, that the channel allocation is not performed, the allocation request unit retransmits the channel allocation request message to the channel response apparatus after a delay time that is included in the channel allocation response message.

2. The apparatus of claim 1, wherein the channel allocation request message includes at least one of a message identification (ID), information to be used for matching with a channel allocation response message, information associated with the QoS conditions requested by the correlated traffic streams, information to be used for discerning the correlated traffic streams, and information to be used for processing the correlated traffic streams.

3. The apparatus of claim 1, wherein, when a channel allocation response message is received from the channel response apparatus, the allocation request unit determines, based on the channel allocation response message, whether the channel allocation is performed, and when the channel allocation is performed, determines information associated with allocated channels.

4. The apparatus of claim 3, wherein the channel allocation response message includes at least one of a message identification (ID), information to be used for matching with the channel allocation request message, information associated with the QoS conditions requested by the correlated traffic streams, information to be used for discerning the correlated traffic streams, information to be used for processing the correlated traffic streams, information indicating whether the channel allocation is performed, information indicating a delay time to be delayed for retransmitting the channel allocation request message, and information indicating a time where the channel allocation is performed.

5. The apparatus of claim 1, further comprising:
a release requesting unit configured to generate, when release of allocated channels is detected, a channel release request message that requests the allocated channels with respect to the correlated traffic streams be released, and to transmit the channel release request message to the channel response apparatus.

6. The apparatus of claim 5, wherein the channel release request message includes at least one of a message identification (ID), information indicating a reason for requesting the channel release, and information associated with the correlated traffic streams.

7. A channel response apparatus, the apparatus comprising:
a communication unit configured to perform, with a channel request apparatus, transmission and reception of messages for channel allocation and channel release; and a channel allocating unit configured to perform: determining bandwidths of channels requested by a plurality of correlated traffic streams that are included in a channel allocation request message, when the channel allocation request message is received from the channel request apparatus, the plurality of correlated traffic streams requesting different Quality of Service (QoS) conditions; determining available channels; generating, when a plurality of channels can be allocated, each to one of the plurality of correlated traffic streams in accordance with its requested channel bandwidth, from the available channels a channel allocation response message including information associated with the plurality of allocated channels, and transmitting the channel allocation response message to the channel request apparatus; and wherein, when the allocation request unit determines, based on a channel allocation response message, that the channel allocation is not performed, the allocation request unit retransmits the channel allocation request message to the channel response apparatus after a delay time that is included in the channel allocation response message.

8. The apparatus of claim 7, wherein the channel allocation request message includes at least one of a message identification (ID), information to be used for matching with the channel allocation response message, information associated with the QoS conditions requested by the correlated traffic streams, information to be used for discerning the correlated traffic streams, and information to be used for processing the correlated traffic streams.

9. The apparatus of claim 7, wherein the channel allocation response message includes at least one of a message identification (ID), information to be used for matching with the channel allocation request message, information associated with the QoS conditions requested by the correlated traffic streams, information to be used for discerning the correlated traffic streams, information to be used for processing the correlated traffic streams, information indicating whether the channel allocation is performed, information indicating a delay time to be delayed for retransmitting the channel allocation request message, and information indicating a time where the channel allocation is performed.

10. The apparatus of claim 7, further comprising:
a channel releasing unit configured to determine channels allocated to the correlated traffic streams that are included in the channel release request message, when the channel release request message is received from the channel request apparatus, and to release the allocated channels.

11. The apparatus of claim 10, wherein the channel release request message includes at least one of a message identification (ID), information indicating a reason for requesting the channel release, and information associated with the correlated traffic streams.

12. A method of requesting channel allocation in a channel request apparatus for a single communication session including a plurality of traffic streams, the method comprising: determining a correlation among the plurality of traffic streams the plurality of traffic streams requesting different Quality of Service (QoS) conditions; generating a channel allocation request message that simultaneously requests channel allocation of a plurality of channels, each to one of the plurality of correlated traffic streams in accordance with its requested channel bandwidth; transmitting the channel allocation request message to a channel response apparatus; determining, based on a channel allocation response message, whether the channel allocation has been performed, when the channel allocation response message is received from the channel response apparatus; and determining information associated with allocated channels, when the channel allocation has been performed; delaying for a delay time included in a channel allocation response message when, based on the channel allocation response message, the channel allocation has not been performed; and retransmitting the channel allocation request message to the channel response apparatus after the delay.

13. The method of claim 12, further comprising: generating a channel release request message that requests the allocated channels with respect to the correlated traffic streams to be released, when release of the allocated channel is detected.

14. A method of allocating a channel in a channel response apparatus, the method comprising: receiving a channel allocation request message from a channel request apparatus; determining bandwidths of channels requested by a plurality of correlated traffic streams that are included in the channel allocation request message, the plurality of correlated traffic streams requesting different Quality of Service (QoS) conditions; determining available channels; determining whether a plurality of channels can be allocated, each to one of the plurality of correlated traffic streams in accordance with its requested channel bandwidth, from the available channels; generating, when the plurality of channels are allocatable, a channel allocation response message including information associated with the plurality of allocated channels; transmitting the channel allocation response message to the channel request apparatus; and wherein, when the allocation request unit determines, based on a channel allocation response message, that the channel allocation is not performed, the allocation request unit retransmits the channel allocation request message to the channel response apparatus after a delay time that is included in the channel allocation response message.

15. The method of claim 14, further comprising:
   receiving a channel release request message from the channel request apparatus;
   determining the plurality of channels allocated to the correlated traffic streams that are included in the channel release request message; and
   releasing the allocated channels.

* * * * *